(12) United States Patent
Deguchi et al.

(10) Patent No.: US 6,895,168 B2
(45) Date of Patent: May 17, 2005

(54) TAPE TRANSPORT APPARATUS

(75) Inventors: Takehiko Deguchi, Takefu (JP); Fumio Kinoshita, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 966 days.

(21) Appl. No.: 09/833,663

(22) Filed: Apr. 13, 2001

(65) Prior Publication Data

US 2002/0021888 A1 Feb. 21, 2002

(30) Foreign Application Priority Data

Apr. 13, 2000 (JP) .................................... 2000-111508

(51) Int. Cl.[7] .............................................. H04N 5/91
(52) U.S. Cl. ............................ 386/68; 386/80; 386/81
(58) Field of Search ........................... 368/68, 78, 80, 368/81, 86, 113, 1, 6, 2

(56) References Cited

U.S. PATENT DOCUMENTS 4,626,936 A * 12/1986 Yoshino ..................... 360/70
4,791,507 A * 12/1988 Doyama et al. .......... 360/77.15
5,589,997 A * 12/1996 Kim ......................... 360/77.14

* cited by examiner

Primary Examiner—Robert Chevalier
(74) Attorney, Agent, or Firm—Wenderoth, Lind & Ponack, L.L.P.

(57) ABSTRACT

A tape transport apparatus enabling a tape winding to be completed even if a winding load is applied to interrupt the tape running during a fast-forward running mode or rewinding running mode. An output voltage applied to a drive motor driving a supply reel or a take-up reel is set at a high voltage during a fast-forward running mode or rewinding running mode and a load flag is turned ON. When a rotation number of the drive motor is reduced under a predetermined rotation number due to the occurrence of the winding load during the load flag being ON, the output voltage applied to the drive motor is sifted from a high voltage to a low voltage and the drive motor is continuously driven to rewind the tape.

5 Claims, 4 Drawing Sheets

TAPE TRANSPORT APPARATUS

BACKGROUND OF THE INVENTION

1. Field of the Invention

This invention relates to a tape transport apparatus for transporting a tape of a video tape recorder and the like.

2. Prior Art

When a video tape recorder is operated in a recording mode or a reproducing mode, a tape is pinched between a capstan and a pinch roller and transported at a predetermined speed by rotatably driving a capstan driven by a capstan motor. And when the video tape recorder is operated in a fast-forward running mode or a rewinding running mode, the tape is wound around a supply reel or a take-up reel by rotatably driving the supply reel or the take-up reel at a high speed by transmitting a driving power of a capstan motor by way of a transmitting mechanism such as a pulley, belt and the like connecting between the supply reel or the take-up reel and the capstan motor with the capstan and the pinch roller disengaged with each other. At the high-speed running mode, a voltage higher than that of a usual running mode such as reproducing mode is applied to the capstan motor so as to thereby rotate at a high rotation speed.

When a winding load is increased due to non-uniform winding or deformation of a tape cassette or the like while the video tape recorder is operated in a fast-forward running mode or a rewinding running mode, the rotation of the capstan motor gets lowered in spite of high voltage applied thereto. In such a case, the electric currency of the capstan motor increases and the capstan motor is heated and thereby there occurs thermal-shut-down which actuates a protect circuit to stop the capstan motor, or otherwise an IC device in a motor driver is destroyed by heat generation. When such troubles occur, the tape can not be wound completely from one reel to another. In addition, an abrupt reduction of tie rotation of the capstan motor caused by a load applied during a high-speed running of the tape may cause a breakage of the tape.

It is therefore an object of the present invention to provide a tape transport apparatus wherein the tape running is achieved without applying a load to a capstan motor even if a winding load increases during a fast-forward running mode or a rewinding running mode.

SUMMARY OF THE INVENTION

In order to solve the problems described hereinbefore, there is provided a tape transport apparatus comprising a tape running means for running a tape, a drive means for driving said tape running means, a control means for controlling an output to be supplied to said drive means depending on a running mode, and a load detection means for detecting a load applied to the tape or the drive means, said control means reducing an output supplied to the drive means by detecting a winding load during tape winding in a fast-forward running mode or a rewinding running mode.

The tape running means includes a supply reel, a take-up reel and a capstan which are used for running a tape, and the drive means includes a single drive motor for driving each reel and a capstan and two drive motors, one for a capstan and another for reels. The control means controls an output voltage applied to the drive motor and applies an output voltage higher than other running modes to transport the tape at a high speed when a fast-forward running mode or a rewinding running mode is selected.

The load detection means is a detector of any changes in operation caused by winding load. For example, a rotation detector to detect a rotation number of a drive motor, reels or a capstan may be used. Furthermore, also available is a speed detector to detect the running speed of a tape or a detector to directly detect a load applied to the tape such as a detector to detect a tape tension or a degree of the looseness of the tape. When the winding load is detected by the load detection means, the output voltage supplied to the drive motor is arranged to be reduced and thereby no excessive electrical current is imposed to the drive motor, so that the drive motor and a motor drive circuit can be protected from damages. The drive motor is not stopped, but the output voltage supplied to the drive motor is reduced instead, so that the drive motor is driven at a lower speed with a drive torque sufficient to transport a tape. Consequently, the tape winding is not interrupted but successively continued without causing troubles due to the winding load.

Other features and objects of the present invention will become apparent from the following description made with reference to the accompanying drawings, in which:

DETAILED DESCRIPTION OF THE EMBODIMENTS

Figure 1:
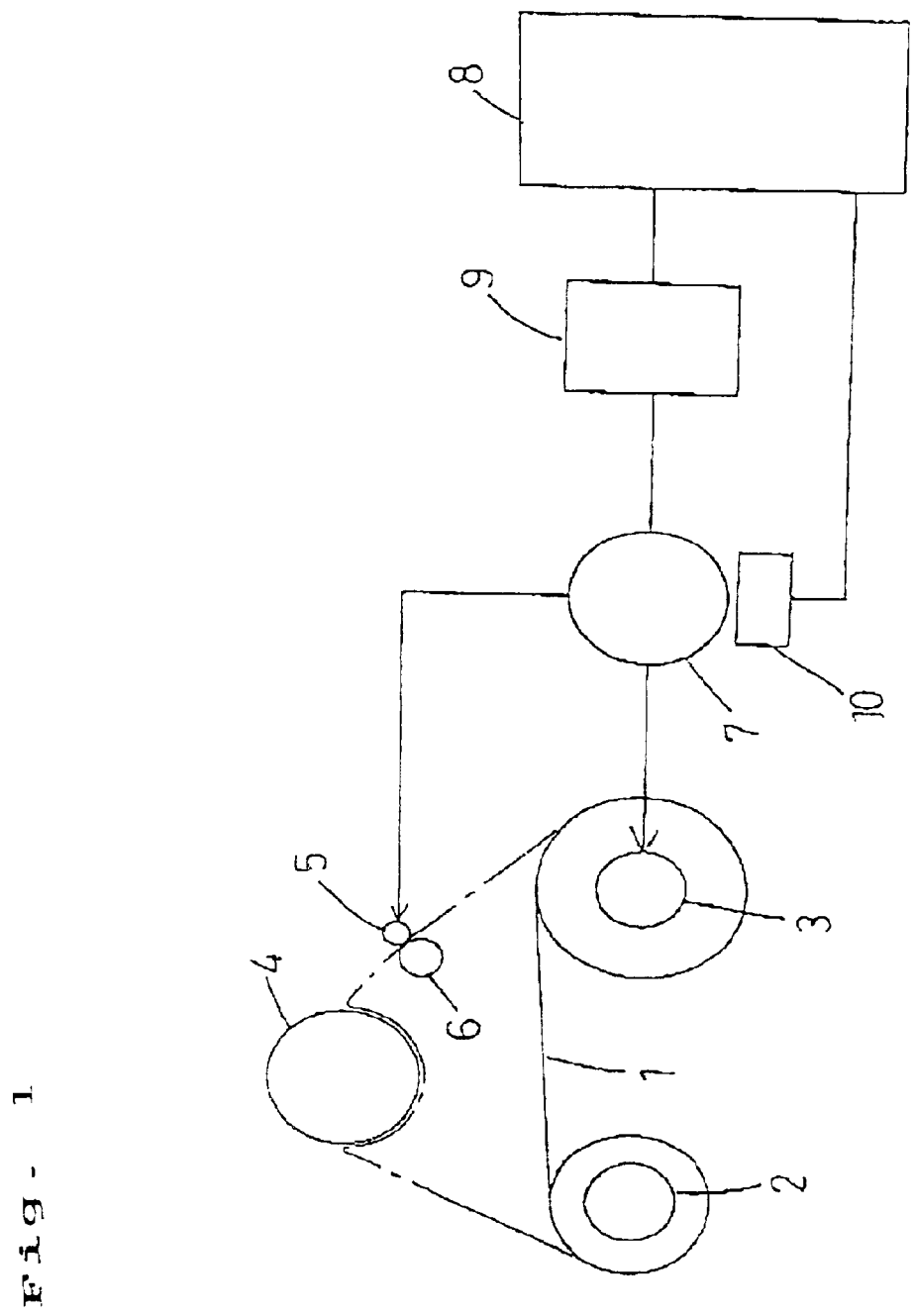
FIG. 1 is a schematic illustration of one embodiment of a tape transport apparatus in accordance with the present invention.

A tape transport apparatus of a video tape recorder according to one embodiment of the present invention is schematically shown in FIG. 1. Shown in FIG. 1 is a well-known tape transport apparatus comprising a supply reel 2 and a take-up reel 3 adapted to transport a tape 1 at a high speed by winding the tape, a capstan 5 and a pinch roller 6 adapted to transport the tape 1 at a predetermined speed by pinching therebetween the tape 1 wound around a rotary cylinder 4, and a drive motor 7 rotatably driving each of the reels 2, 3 and the capstan 5. A driving force of a high torque is transmitted from the drive motor 7 selectively to either of the reel 2 and the reel 3 depending on the tape running direction by means of a transmitting mechanism such as a pulley, a belt and the like, while a driving force of a low torque is transmitted to the capstan 5.

Also provided with is a controller 8 adapted to control a drive mode of the drive motor 7 depending on a tape running mode of a reproducing mode, a recording mode, a fast-forward reproducing mode, a rewinding reproducing mode, a fast-forward running mode, and a rewinding running mode of a video tape recorder. In reply to the output voltage supplied from the controller 8, a motor driver 9 drives the drive motor 7 at a predetermined rotation number. The rotation number of the drive motor 7 is detected by a rotation detector 10 such as, for example, a frequency generator (FG) generating a frequency signal proportional to the rotation number of the drive motor 7 to be supplied to the controller 8. The rotation detector 10 may be arranged so as to detect the rotation number of the capstan 5 driven by the drive motor 7. Alternatively, the rotation detector 10 may be arranged so as to detect the rotation number of the reels 2 and 3 which rotate synchronizing with the rotation of the capstan 5.

Figure 2:
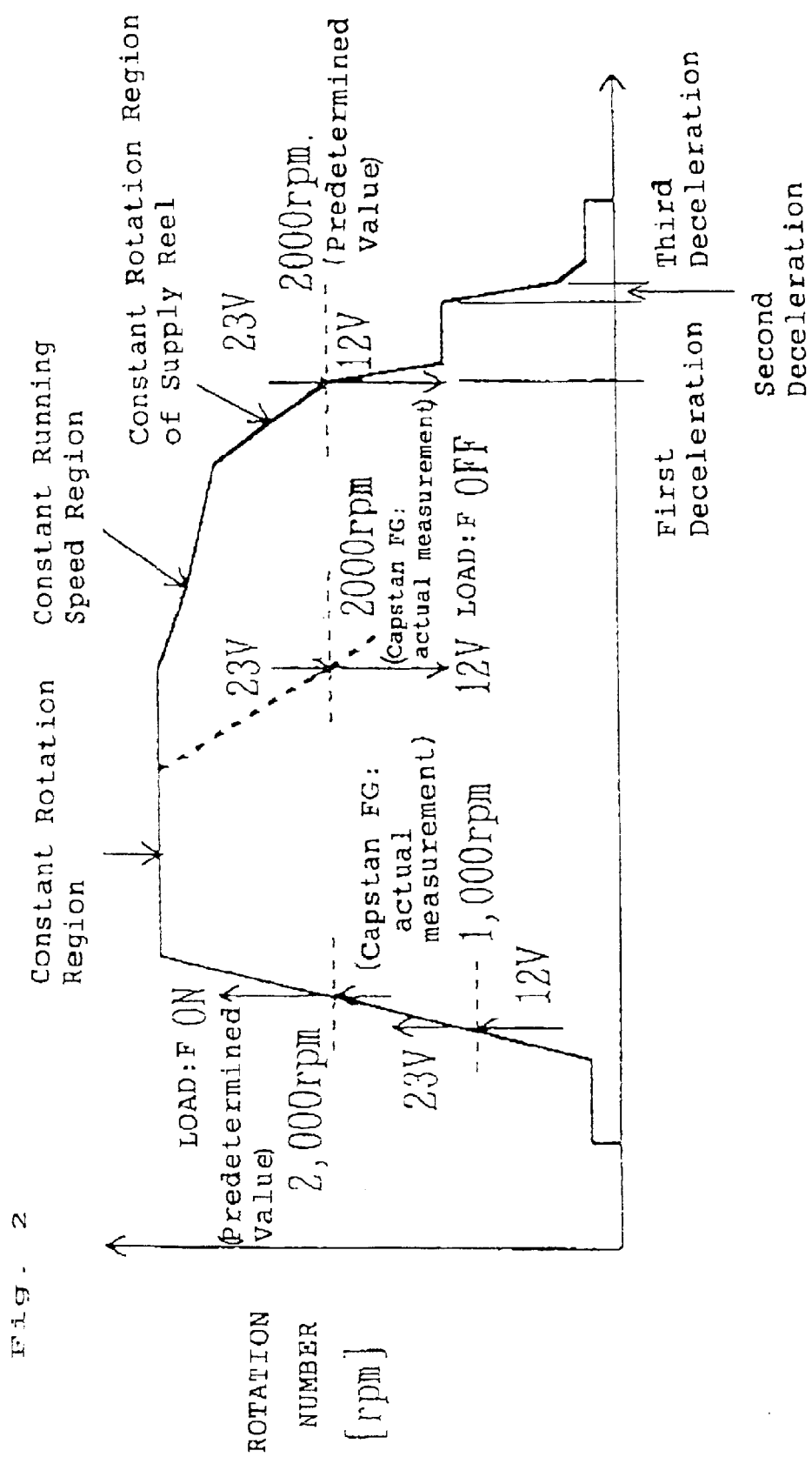
FIG. 2 is a diagram showing the timing of the acceleration and deceleration of a drive motor during a tape running at a high speed.

The controller 8 is a microcomputer switching the direction for transmitting a drive force of the drive motor 7 in compliance with a mode inputted and controlling the output voltage supplied to the drive motor 7 so as to obtain a tape running speed in compliance with the input mode. In a fast-forward running mode or a rewinding running mode, the drive motor 7 is rotated at a high speed to transport the tape 1 at a high speed. As shown in FIG. 2, a low voltage is supplied to the drive motor 7 until the rotation number of the drive motor 7 exceeds a first preset value, and subsequently the voltage supplied to the drive motor 7 is switched to a higher one. When the rotation number of the drive motor 7 reaches the maximum rotation number, the drive motor 7 is controlled so as to rotate at a predetermined constant speed maintaining the maximum rotation number. The running speed of the tape 1 is increasing. When the increasing tape running speed reaches a predetermined speed, the drive motor 7 is controlled so as to maintain said running speed and the rotation number of the drive motor 7 is reduced gradually. Subsequently, when the rotation number of the supply reel 2 reaches a predetermined rotation number, the drive motor 7 is so controlled as to maintain said rotation number and the rotation number of the drive motor 7 is reduced further. When the rotation number of the drive motor 7 is reduced to a predetermined rotation number, the output voltage applied to the drive motor 7 is switched from a high voltage to a low voltage to perform a first speed reduction. When the rotation number of the drive motor 7 reaches a predetermined rotation number, a second speed reduction is performed and a third speed reduction is performed at a lower rotation number. Finally, the output voltage applied to the drive motor 7 is made zero and the tape running is stopped by effectuating the brake.

Figure 3:
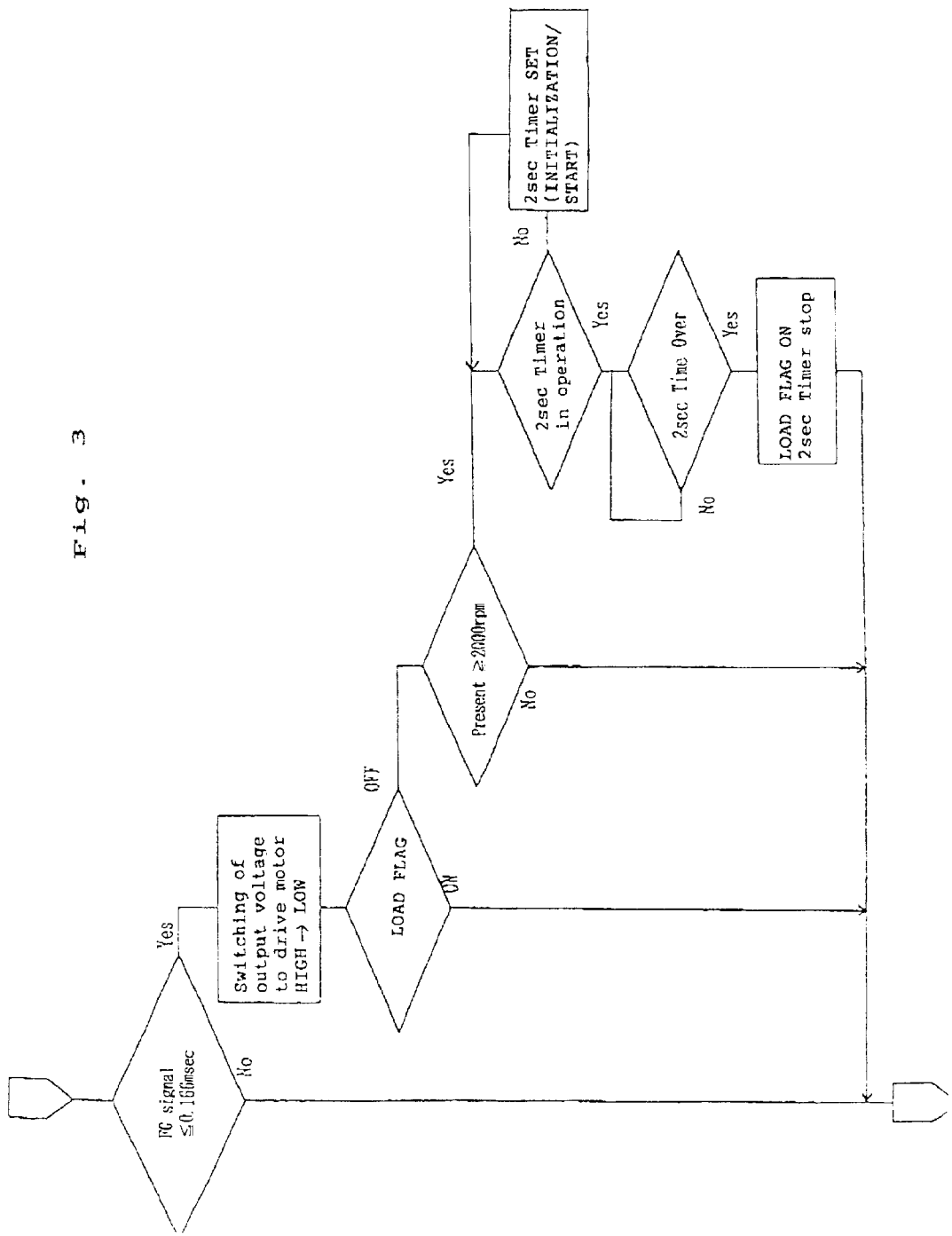
FIG. 3 is a flow chart showing a control mechanism at a high speed tape running.

Thus, by conducting the acceleration and deceleration of the drive motor 7 stepwise, a tape winding can be made in conformity with the winding condition of the tape 1, so that a time required for a fast-forward running or a rewinding running is reduced and a high speed winding can be attained. By the way, in other tape running mode, the output voltage applied to the drive motor 7 is set to be a low voltage The above described operations in a fast-forward running mode or a rewinding running mode will be explained concretely with reference to the flow chart appeared in FIG. 3. At first, the output voltage to the drive motor 7 is increased gradually up to a low voltage (12V). By driving the drive motor 7 the tape 1 starts to run slowly. When the rotation number of the drive motor 7 exceeds the first predetermined value (1,000 rpm) by the actual measurement, namely, when a FG period detected by the rotation detector 10 is under 0.166 msec, the output voltage applied to the drive motor 7 is switched from the low voltage (12V) to the high voltage (23V) and increased further Then the running speed of the tape 1 is increased gradually. When the rotation number of the drive motor 7 is increased and exceeds the second predetermined value (2,000 rpm), the controller 8 operates a timer for a fixed time, e.g. two seconds, and then a load flag is turned ON.

Thereafter, when the rotation number of the drive motor 7 reaches the maximum rotation number, the drive motor 7 is controlled so as to rotate at a predetermined constant speed maintaining the maximum rotation number and the high speed winding of the tape is performed. With the tape 1 being wound, the running speed of the tape 1 gets faster.

Then the rotation number of the drive motor 7 is reduced gradually so that the running speed of the tape 1 becomes constant. With the tape 1 being wound further, the rotation speed of the supply reel 2 becomes too fast. Then the rotation number of the drive motor 7 is reduced further, so that the rotation number of the supply reel 2 becomes constant. When the rotation number of the drive motor 7 is under the predetermined value (2,000 rpm), the output voltage supplied to the drive motor 7 is switched from a high voltage to a low voltage and a load flag is turned OFF. Then the rotation number of the drive motor 7 is reduced rapidly and the first deceleration can be performed.

When the area of the take-up reel 3 reaches a predetermined value in conformity with the tape amount wound up around the reel, the drive motor 7 is so controlled as to reduce the rotation number and the second deceleration is performed. Subsequently, when the rotation number of the drive motor 7 is under the predetermined rotation number (500 rpm), the third deceleration is performed to rotate the drive motor 7 at a lower speed. By such stepwise decelerations, the running speed of the tape 1 is reduced while maintaining a tape tension nearly constant and the rewinding of the tape 1 is stopped when a tape end is detected.

According to such stepwise decelerations performed at the best points, the running tape can be decelerated in conformity with the tape end without causing a rapid deceleration. The tape winding can be performed maintaining the tape tension constant without causing the slack of the running tape. Further, the tape rewinding can be completed without a sudden stop of tie tape running, so that the tape 1 and the related mechanism can not be damaged, thus resulting in a safe tape rewinding.

The controller 8 monitors any changes of the rotation number of the drive motor 7 detected by the rotation detector 10 in a fast-forward running mode or a rewinding running mode. When the rewinding load of the tape 1 is increased by some causes, and especially when the rewinding load increases during a high voltage drive of the drive motor 7 being performed, the drive motor 7 may have a breakdown. So, the controller 8 detects the rotation number of the drive motor 7 to thereby detect such a load applied to the drive motor. When the rotation of the drive motor 7 is reduced and the controller 8 detects the great deviation from the rotation number in conformity with the output from the controller 8, the controller 8 performs such a load adjustment as to reduce the output voltage applied to the drive motor 7.

Figure 4:
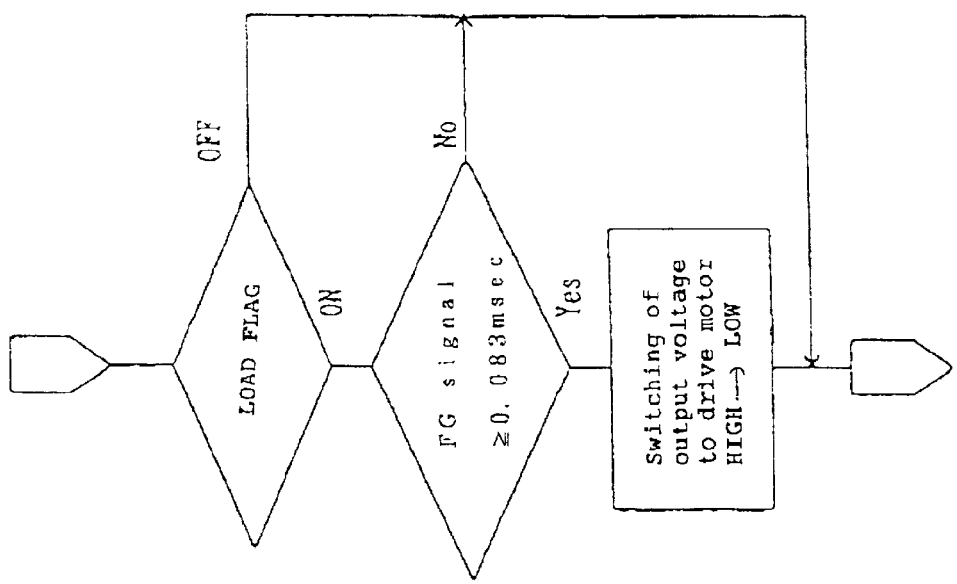
FIG. 4 is a flow chart showing a load adjustment system.

Namely, as shown by the flow chart in FIG. 4, monitoring of the changes in the rotation number of the drive motor 7 is performed when the drive motor 7 rotates at a high speed under a high voltage and the load flag is turned ON.

When the flag is turned ON simultaneously with switching the output voltage applied to the drive motor 7 from a low voltage to a high voltage, erroneous detecting of the load is likely to occur as the rotation number changes widely at the moment of the voltage change. Accordingly, a predetermined time-lag is set at the time of a load detection so as to enhance the accuracy of such load detection.

When the rotation number of the drive motor 7 is reduced under the predetermined rotation number (2,000 rpm) at an actual measurement, the output voltage supplied to the drive motor 7 is switched from a high voltage to a low voltage and a load flag is turned OFF. Then the drive motor 7 is being driven under a low output voltage and the tape winding is performed. During the tape rewinding, the stepwise deceleration as described above is performed to wind up the tape 1 as soon as possible.

As being apparent from the above, when a load is applied to the drive motor 7 driven under a high output voltage, the drive motor 7 is prevented from being applied a large current and the drive motor 7 and driver unit or circuit is free from any damages.

When the rotation of the reels 2 and 3 are stopped completely due to a load applied thereto, a fast-forward running mode or a rewinding running mode is released for a moment. Then an output voltage applied to the drive motor 7 is shifted to a low voltage, and thereafter a mode is switched to a fast-forward reproducing mode or a rewinding reproducing mode so as to continue a tape winding utilizing the driving force of the capstan 5. When such tape winding can be made for a predetermined time without any trouble, such judgement being made as the load is released and the tape winding is continued under the fast-forward running mode or the rewinding running mode again. Such tape winding is repeated until the winding up of the tape 1 is completed.

Although the present invention has been described and illustrated in accordance with an embodiment, it is to be understood that one skilled in the art can make a variety of modifications within the scope of the present invention.

For example, considering the fact that the change of the rotation number of a drive motor varies depending on the degree of a load applied to the drive motor, a predetermined rotation number for detecting a load may be divided into several stages, and an output voltage corresponding to each stage thereof may be set for switching the output voltage in conformity with the degree of a load. With such arrangement, the reduction of the tape running speed is limited to the minimum and the time required for winding the tape can be shorted to a desired extent. Further, the switching operation of an output voltage applied to the drive motor may be set not only to be two steps but also to be three steps or more. In such a case, a predetermined rotation number of a drive motor is set at each of the steps, and when a load is detected at any one of these steps, the output voltage is shifted to a lower voltage by one step.

Furthermore, the above load adjustment operation is applicable not only to the high speed running such as the fast-forward running mode or the rewinding running mode but also to the normal speed running mode such as in the reproducing mode so as to prevent the occurrence of the elongation or breakage of the tape.

As will be apparent from the description hereinbefore, the present invention provides a novel tape transport apparatus wherein the output voltage applied to the drive motor is reduced when a winding load is applied during tape rig so as to prevent the drive motor from being applied an excessive electric current and to protect the drive motor from any damages. As the drive motor is driven in spite of the reduction of the output thereto, the tape running is allowed to continue so as to perform a mode under operation consecutively Especially, even if such winding load occurs during a fast-forward running mode or a rewinding running mode, the tape winding can be performed completely to the last.

What is claimed is:

1. A tape transport apparatus comprising a tape running means for running a tape, a drive means for driving said tape running means, a control means for controlling an output to be supplied to said drive means depending on a running mode, and a load detection means for detecting a load applied to the tape or the drive means, said control means reducing an output supplied to the drive means by detecting a load applied to the tape or the drive means during tape running in a fast-forward running mode or a rewinding running mode.

2. A tape transport apparatus comprising reels for running a tape, a drive motor for rotatably driving said reels, a controller for controlling an output voltage supplied to said drive motor in compliance with a running mode, and a detector for detecting the rotation number of the drive motor or the reels, said controller reducing an output voltage supplied to the drive motor when the rotation number detected by the detector is lower than a predetermined rotation number in a fast-forward running mode or a rewinding running mode.

3. A tape transport apparatus comprising reels for running a tape, a drive motor for rotatably driving said reels, a controller for stepwise switching an output voltage supplied to the drive motor so as to decelerate or accelerate the rotation of the reels in a fast-forward running mode or a rewinding running mode, and a detector for detecting the rotation number of the drive motor, said controller reducing an output voltage supplied to the drive motor to a lower voltage by one-step when the rotation number of the drive motor is lower than a predetermined rotation number preset in compliance with the output voltage.

4. A tape transport apparatus as claimed in claim 3, wherein the controller controls a load flag to be turned ON when an output voltage is switched to a high voltage and judges whether a load is applied during the load flag being ON.

5. A tape transport apparatus as claimed in claim 4, wherein the controller stops said judgment of a load for a predetermined period of time immediately after a load flag is turned ON.

* * * * *